(12) United States Patent
Durkee et al.

(10) Patent No.: US 12,305,150 B2
(45) Date of Patent: May 20, 2025

(54) METHOD AND SYSTEM FOR PRODUCING ULTRA-HIGH GRAVITY ALCOHOLIC BEVERAGES

(71) Applicant: PORIFERA, INC., San Leandro, CA (US)

(72) Inventors: David Durkee, Lakewood, CO (US); Frederik Havel, Beaconsfield (CA)

(73) Assignee: Porifera, Inc., San Leandro, CA (US)

( * ) Notice: Subject to any disclaimer, the term of this patent is extended or adjusted under 35 U.S.C. 154(b) by 0 days.

(21) Appl. No.: 18/510,880

(22) Filed: Nov. 16, 2023

(65) Prior Publication Data

US 2024/0084231 A1 Mar. 14, 2024

Related U.S. Application Data

(62) Division of application No. 16/769,338, filed as application No. PCT/US2018/064281 on Dec. 6, 2018, now abandoned.

(60) Provisional application No. 62/595,950, filed on Dec. 7, 2017.

(51) Int. Cl.
| | |
|---|---|
| B01D 61/00 | (2006.01) |
| B01D 61/02 | (2006.01) |
| B01D 61/58 | (2006.01) |
| C12C 11/11 | (2019.01) |
| C12G 3/08 | (2006.01) |
| C12H 6/00 | (2019.01) |

(52) U.S. Cl.
CPC ........... *C12H 6/00* (2019.02); *B01D 61/0021* (2022.08); *B01D 61/005* (2013.01); *B01D 61/025* (2013.01); *B01D 61/58* (2013.01); *C12C 11/11* (2013.01); *C12G 3/08* (2013.01); *B01D 2311/2523* (2022.08)

(58) Field of Classification Search
CPC ..... B01D 61/002; B01D 61/025; B01D 61/58
See application file for complete search history.

(56) References Cited

U.S. PATENT DOCUMENTS

| | | |
|---|---|---|
| 9,206,060 B1 | 12/2015 | Abusharkh |
| 2007/0031954 A1 | 2/2007 | Mairal et al. |
| 2010/0224561 A1 | 9/2010 | Marcin |

(Continued)

FOREIGN PATENT DOCUMENTS

| | | |
|---|---|---|
| EP | 0180442 A2 * | 5/1986 |
| EP | 3101114 A1 | 12/2016 |

(Continued)

OTHER PUBLICATIONS

"Examination Report for EP18886863.2, mailed on Mar. 28, 2024".

(Continued)

*Primary Examiner* — Bradley R Spies
(74) *Attorney, Agent, or Firm* — Dorsey & Whitney LLP (57) ABSTRACT

Methods and systems are described that produce an ultra-high gravity alcoholic beverage from a high gravity alcoholic beverage stream using an efficient, low waste, combination reverse osmosis and forward osmosis system. Utilizing a reverse osmosis system prior to using a forward osmosis system in removing water content from a high gravity alcoholic beverage stream significantly reduces a draw solution load when compared to a process that utilizes a forward osmosis system alone or prior to using any other dewatering system.

16 Claims, 3 Drawing Sheets

(56) References Cited

U.S. PATENT DOCUMENTS

| | | | |
|---|---|---|---|
| 2014/0224716 A1* | 8/2014 | Hancock | C02F 1/445 210/195.2 |
| 2016/0136579 A1 | 5/2016 | McGovern et al. | |
| 2016/0230133 A1 | 8/2016 | Peterson et al. | |
| 2017/0260487 A1 | 9/2017 | De Schutter et al. | |
| 2018/0311618 A1* | 11/2018 | Benton | C12H 3/04 |
| 2022/0267700 A1* | 8/2022 | Havel | C12C 12/00 |

FOREIGN PATENT DOCUMENTS

| | | | | |
|---|---|---|---|---|
| EP | 3252136 A1 | 12/2017 | | |
| EP | 3330361 A1 | 6/2018 | | |
| JP | 2011514140 A | 5/2011 | | |
| JP | 2013150954 A | 8/2013 | | |
| JP | 2015215717 A | 12/2015 | | |
| JP | 2016514039 A | 5/2016 | | |
| JP | 6874384 B2 | 4/2021 | | |
| WO | 2016160810 A1 | 10/2016 | | |
| WO | 2016207079 A1 | 12/2016 | | |
| WO | 2016210337 A3 | 12/2016 | | |
| WO | WO-2016210337 A2 * | 12/2016 | | B01D 3/145 |
| WO | 2018200538 A1 | 11/2018 | | |
| WO | 2019113335 A1 | 6/2019 | | |

OTHER PUBLICATIONS

Third Office Action for CA 3,084,619, mailed on Nov. 2, 2022, pp. all.

"English Translation of Office Action for JP2020-531071, mailed Jul. 7, 2021".

"Examination Report for AU Patent App. 2018378697, mailed on Mar. 25, 2021".

"Examination Report for GB2008545.2, mailed on Jan. 27, 2022".

"Examination Report for GB2008545.2, mailed on Jun. 23, 2022".

"Examination Report for GB2008545.2, mailed on Oct. 3, 2022".

"Extended European Search Report for EP18886863.2, mailed on Sep. 28, 2021".

"International Search Report and Written Opinion for PCT/US2018/064281, mailed on Feb. 6, 2019".

"Office Action for CA 3,084,619, mailed on Feb. 4, 2022".

"Office Action for CA 3,084,619, mailed on Jun. 30, 2021".

"Examination Report for CA Appl. No. 3,084,619, mailed Dec. 4, 2023".

"Examination Report for EP18886863.2, mailed on Dec. 23, 2024".

"Office Action for CA Appl. No. 3,084,619, mailed on Feb. 7, 2025".

* cited by examiner

METHOD AND SYSTEM FOR PRODUCING ULTRA-HIGH GRAVITY ALCOHOLIC BEVERAGES

CROSS REFERENCE TO RELATED APPLICATIONS

This application is a divisional application of U.S. patent application Ser. No. 16/769,338, which entered the U.S. national phase on Jun. 3, 2020, and is a national phase application of PCT Application No. PCT/US2018/064281, filed on Dec. 6, 2018, and claims the benefit of and priority, under 35 U.S.C. § 119(e), to U.S. Provisional Application Ser. No. 62/595,950, filed Dec. 7, 2017, the entire disclosure of which is hereby incorporated herein by reference, in its entirety, for all that it teaches and for all purposes.

FIELD

The present disclosure is generally directed to aqueous alcohol solutions, in particular, toward the dewatering of alcohol beverages such as beer, cider, and alcoholic malt bases.

BACKGROUND

Water is the major component in most beverages, including fermented malt beverages, hard cider, beer, alcopop, etc. The greater the amount of water in a beverage, the greater the physical weight of the beverage itself. As can be appreciated, shipping or transporting beverages with high water content and increased weight can have negative effects on the environment and on the costs of the beverage product.

Reducing the water content of malt beverages can significantly reduce the overall weight of the product by producing a dewatered alcoholic beverage product. Due to the reduced weight of the dewatered alcoholic beverage product, the product can be efficiently transported, shipped, and stored. Once the product reaches an intended destination, and prior to consumption, the dewatered alcoholic beverage product can be reconstituted by simply adding carbonated water. Among other benefits, the production of a dewatered alcoholic beverage product can reduce the costs and environmental impact associated with transporting and storing standard, or sales gravity, alcoholic beverages and products.

BRIEF SUMMARY

In certain embodiments, the present disclosure relates to a method and system that provides a substantially dewatered, or dehydrated, ultra-high gravity (UHG) alcoholic beverage product.

In one embodiment, the process may include receiving a high-gravity (HG) alcoholic beverage (e.g., beer, cider, alcoholic malt bases, etc.) having an alcohol by volume (ABV) of approximately 5% to 14%. The HG alcoholic beverage may be fed into a forward osmosis (FO) system where a UHG alcoholic beverage product (e.g., having approximately 24% ABV, or more) may be produced using FO. In particular, as the HG alcoholic beverage is processed in the FO system, the water content of the HG alcoholic beverage solution may be significantly reduced, resulting in a UHG alcoholic beverage product. In some embodiments, spent draw solution from the FO system may then be fed into a multiple-stage reverse osmosis (RO) system to produce a draw solution that can be returned to the FO system. In this instance, purged water from the multiple-stage RO system may be directed elsewhere in the system (e.g., for other use, repurposing, recycling, etc.). The purged water may comprise potable water that can be conveyed in a separate fluid line apart from the recycled draw solution. Although capable of producing a UHG alcoholic beverage product, the FO process, by itself, generally requires a large draw solution load as well as large FO units and tanks.

It is with respect to the above issues and other problems that the embodiments presented herein were contemplated. Systems and processes are provided for producing a UHG alcoholic beverage from an HG alcoholic beverage using an efficient, low waste, ordered combination of RO and then FO dewatering systems. In particular, the embodiments described herein describe receiving an HG alcoholic beverage (e.g., at approximately 5% ABV or more), and dewatering the HG alcoholic beverage to an approximate 16% to 22% ABV using an initial RO system. This approximately 16% to 22% ABV alcoholic beverage may be referred to as a very-high gravity (VHG) alcoholic beverage. The VHG alcoholic beverage may then be fed into an FO system, where an additional percentage of the water content is removed from the VHG alcoholic beverage, using an FO system. Removing the additional amount of water content via the FO system produces a UHG alcoholic beverage of approximately 24% to 46% ABV, or more. As described herein, the combination of the RO and then FO dewatering systems provide an efficient approach to successively increasing the gravity of alcoholic beverages. Among other things, these efficient methods and systems can reduce the FO draw solution load (e.g., when compared to an FO and then RO dewatering approach, etc.) by greater than 80% as well as reducing the required size of the dewatering units, tanks, and equipment. Moreover, the new combination process reduces the complexity of the draw solution recycling process by eliminating a number of RO stages from the multiple-stage RO system described above.

Additional features and advantages are described herein and will be apparent from the following Description and the figures.

DETAILED DESCRIPTION

Embodiments of the present disclosure will be described in connection with an efficient and low-waste alternative to any single osmosis-type dewatering approach to removing water content from alcoholic beverages. In some embodiments, the methods and systems described herein may receive an HG alcoholic beverage (e.g., between 5% ABV and 14% ABV, etc.) at an initial RO system where a VHG alcoholic beverage (e.g., between about 16% ABV and 22% ABV) is produced using an RO process and system. The VHG alcoholic beverage may then be fed into an FO system where a UHG alcoholic beverage (e.g., between about 24% ABV and 46% ABV) is produced using an FO process and system. In some embodiments, spent draw solution from the FO system may then be fed into a simplified RO system, or distillation system, to produce a recycled draw solution that may be returned to the FO system. In one embodiment, purged water from the RO system may be recycled, packaged, or directed elsewhere for use the system.

As described herein, removing an amount of water content in alcohol-based beverages may increase the overall gravity of the resultant dewatered alcoholic beverage. The terms "alcoholic beverage," "alcohol-based beverage(s)," "alcohol fluid(s)," "alcohol solution(s)," and the like, may be used interchangeably herein to refer to any beer, lager, stout, ale, porter, fermented malt beverage, cider (e.g., apple, pear, etc.), alcoholic malt base, etc., and/or combination thereof. In addition, the terms "high gravity," or "HG," "very-high gravity," or "VHG," and "ultra-high gravity," or "UHG," may be used herein to refer to an amount of the total number of dissolved solids in water remaining in the alcoholic beverage or the relative strength of the alcoholic beverage compared to water. For instance, a UHG beer may have a greater quantity of dissolved solids in the water remaining in the alcoholic beverage than that of a VHG beer, a VHG beer may have a greater quantity of dissolved solids in the water remaining in the alcoholic beverage than that of an HG beer, and so on. In addition, the UHG beer has a greater amount of alcohol remaining in the alcoholic beverage than that of a VHG beer, a VHG beer has a greater amount of alcohol remaining in the alcoholic beverage than that of an HG beer, and so on.

Figure 1:
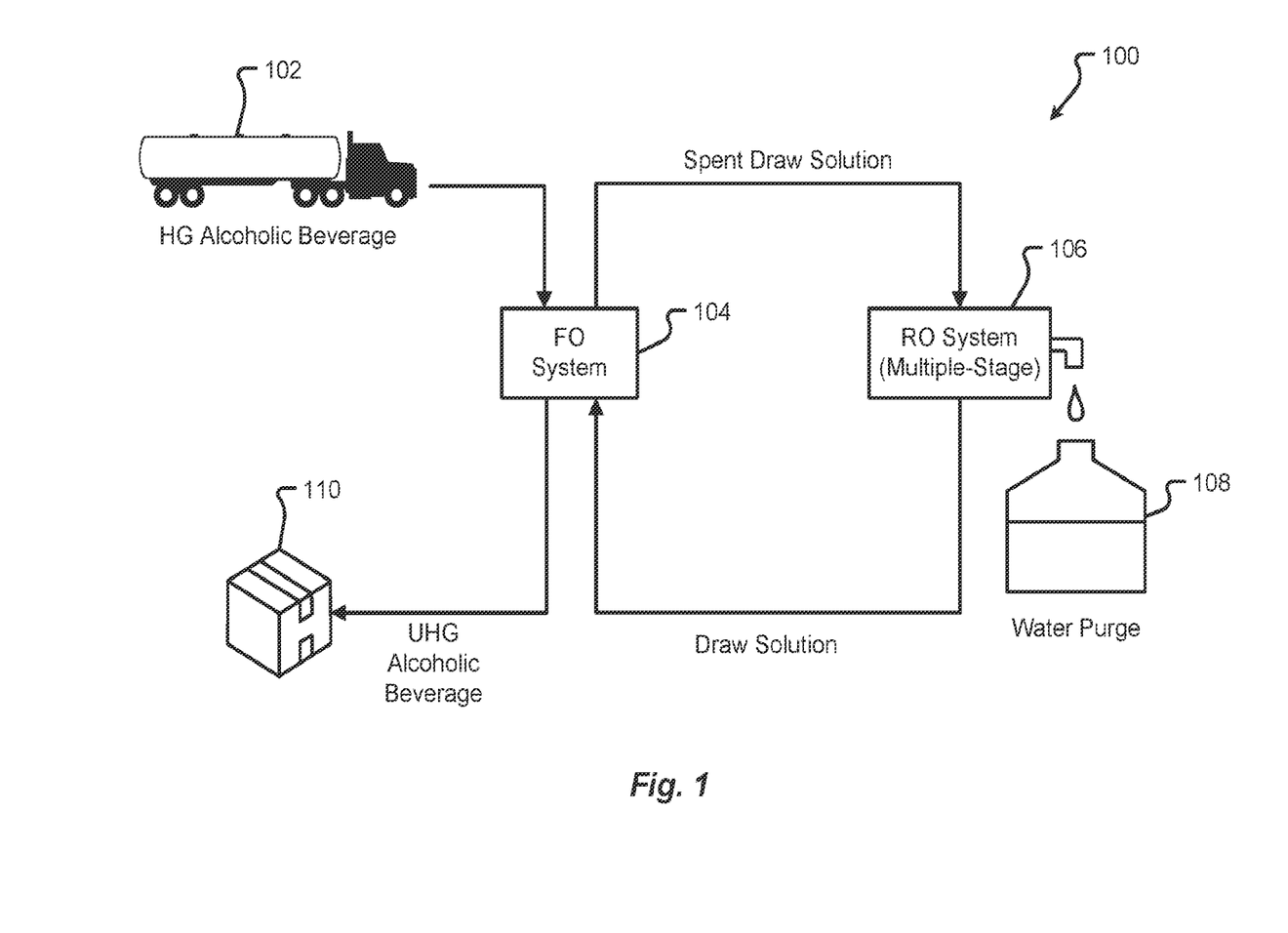
FIG. 1 is a block diagram of a system for dewatering alcoholic beverages using a forward osmosis and reverse osmosis system in accordance with embodiments of the present disclosure.

Referring to FIG. 1, a block diagram of a system 100 for removing an amount of water from an alcoholic beverage is shown in accordance with embodiments of the present disclosure. The HG alcoholic beverage 102 may be provided to a forward osmosis (FO) system 104 to produce a UHG alcoholic beverage 110. In some embodiments, the HG alcoholic beverage may be provided via one or more fluid lines, pipes, tanks, or the like. In one embodiment, the HG alcoholic beverage may be pumped, or otherwise conveyed, along a fluid line from a manufacturing source.

As shown in FIG. 1, the FO system 104 may utilize a draw solution to provide the necessary (reduced) osmotic pressure within the FO system 104. The FO system 104 may correspond to an FO filtration device containing one or more sets, or banks, of FO filter membranes. In the FO system 104, one side of a filter membrane (e.g., a semipermeable membrane, and/or a series of semipermeable membranes, etc.) may be contacted with the HG alcoholic beverage 102 to be dewatered and the other side of the filter membrane may be contacted with a draw solution that results in "pulling" at least some of the water out of the HG alcoholic beverage 102 through the filter. In some embodiments, the FO system 104 may be configured to handle a desired volumetric flow through the system 104 to accommodate desired production requirements. For example, the FO system 104 may comprise one or more FO membranes that provide a flow path for the HG alcoholic beverage 102 to optimize dewatering and desired throughput. The flow path may include a serpentine pattern, or any other type of tortuous flow, path in which a surface area of the FO membrane in contact with both the HG alcoholic beverage stream and the draw solution ensures a desired level of HG alcoholic beverage 102 stream dewatering. It is also contemplated that the FO system 104 could include a plurality of FO filters arranged in series or in parallel to address desired throughput production requirements.

The HG alcoholic beverage 102 stream and draw solution stream may be pressurized to provide the desired flow rate through the FO system 104. Accordingly, one or more pumps can be used for pressuring the respective streams. Alternatively, one or both of the streams can be gravity fed through the FO system 104 in which the streams have sufficient pressure heads to flow through the system 104.

The permeate water and draw solution define a spent draw solution that may be subsequently transferred to an RO system 106 for recycling, in which the spent draw solution is treated to remove the excess water content. In some embodiments, the excess water removed may be collected (e.g., via a tank, pipe, or other fluid line) at a water purge 108. The UHG alcoholic beverage 110, produced via the FO system 104, may be ready for packaging in which no further processing steps are required. In one embodiment, the UHG alcoholic beverage 110 may have a reduced water content such that the UHG alcoholic beverage has an ABV range between, and including, approximately 24% to 46%.

The spent draw solution may be returned to its original strength for reuse which may be achieved by passing the water and draw solution through a cascading set of RO stages. In a first RO stage, the retentate solution from the first RO stage may be transported to another RO filtration stage. The retentate solution from the second RO stage may be transported to yet another RO filtration stage, and so on. This cascading or serial treatment of the spent draw solution is continued until the resultant solution has the desired water content amount. This resultant solution can then be used again in the FO filtration in the FO system 104. In some embodiments, the permeate stream from each RO stage may be returned to a previous RO filtration stage that has a similar water content so that there is a continual circulation of the draw solution until treated to a desired water content amount.

In some embodiments, the HG alcoholic beverage 102 may be pre-treated, or preconditioned, to better place the HG alcoholic beverage 102 in a condition to be dewatered. For example, it may be desired to remove dissolved oxygen in the HG alcoholic beverage 102. This can be accomplished by use of nitrogen purged fluid lines through which the HG alcoholic beverage 102 passes. As the HG alcoholic beverage 102 passes through the fluid lines that are purged with the nitrogen gas, dissolved oxygen is removed from the HG alcoholic beverage 102.

In some embodiments, the HG alcoholic beverage 102 supplied to the FO system 104 may be physically stabilized (e.g., prior to dewatering, etc.). In some embodiments, the HG alcoholic beverage 102 may be "chill proofed" prior to entering the FO system 104. In any event, physical stabilization may be obtained by the selective addition of any one or more of tannic acid, SiOH, PVPP treatment, proteolytic enzyme, pectinase enzyme and/or cold treatment, holding the HG alcoholic beverage 102 at a temperature of to −1° C. to −7° C. for a predetermined period of time, etc., and/or combinations thereof.

The treated HG alcoholic beverage 102 stream exits the FO system 104 downstream as the UHG alcoholic beverage 110. The UHG alcoholic beverage 110 may then be transported to a packaging station, providing a UHG alcoholic beverage product.

When the UHG alcoholic beverage 110 is to be prepared for consumption, a metered amount of water may be added back to the UHG alcoholic beverage 110, along with desired carbonation (e.g., carbonated water, etc.). In this manner, the UHG alcoholic beverage 110 can be shipped and transported with a certain amount of water removed thereby reducing the overall weight of the product and, prior to consumption, the product can be rehydrated and/or carbonated.

Figure 2:
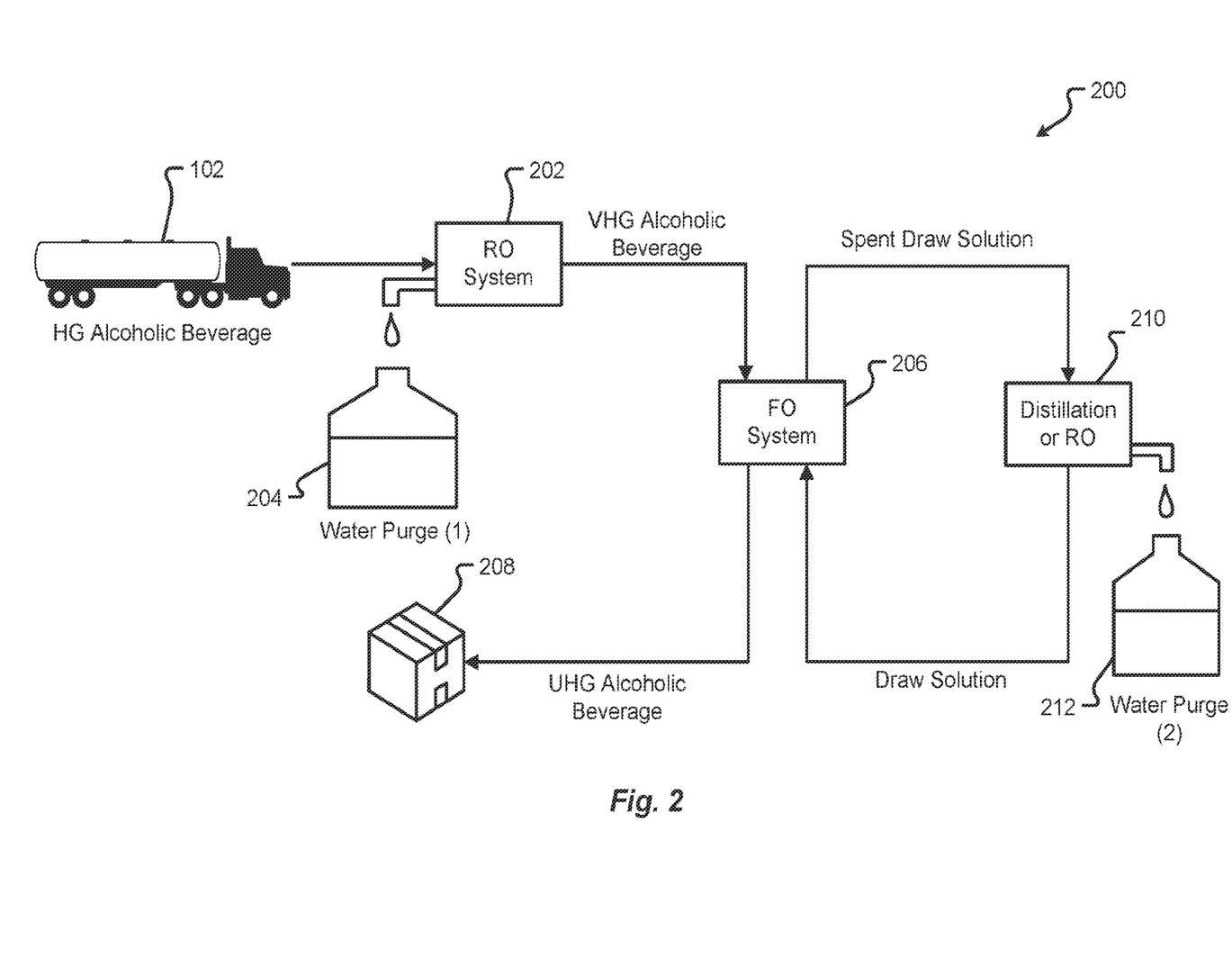
FIG. 2 is a block diagram of a system for dewatering alcoholic beverages using a reverse osmosis and forward osmosis system in accordance with embodiments of the present disclosure.

FIG. 2 is a block diagram of a system 200 for efficiently removing an amount of water from a supplied alcoholic beverage (e.g., an HG alcoholic beverage 102 and a VHG alcoholic beverage, etc.) in accordance with embodiments of the present disclosure. In one embodiment, an HG alcoholic beverage 102 stream, comprising an ABV between, and including, 5% to 14%, may be provided to the RO system 202 via one or more fluid lines. In some embodiments, the RO system 202 may provide an initial water content removal operation on the HG alcoholic beverage 102 supplied thereto. For instance, the HG alcoholic beverage 102 may be conveyed, under pressure (e.g., pumped, etc.), to the RO system 202 (e.g., an initial dewatering station in the system 200) comprising one or more semipermeable membranes. The semipermeable membranes may serve to remove water content from the HG alcoholic beverage 102. Water removed by the RO system 202 may be collected from one side of the one or more semipermeable membranes in a water purge 204 tank, or fluid line. In some embodiments, this water may be reused, recycled, or packaged, etc. Upon removing water content from the HG alcoholic beverage 102, the RO system 202 provides a VHG alcoholic beverage on the other side of the one or more semipermeable membranes. In some embodiments, this VHG alcoholic beverage may have an ABV between, and including, 16% to 22%. This VHG alcoholic beverage may then be fed into the FO system 206 (e.g., a secondary dewatering station in the system 200), which then produces a UHG alcoholic beverage 208, for example, having an ABV of approximately 24% to 46%. In some embodiments, the FO system 206 described in conjunction with FIG. 2 may be similar, if not identical, to the FO system 104 described in conjunction with FIG. 1.

In one embodiment, the FO system 206 may utilize a draw solution to provide the necessary (reduced) osmotic pressure within the FO system 206. The spent draw solution may be conveyed, or otherwise provided, to a distillation or subsequent RO system 210. The distillation or RO system 210 may dewater the spent draw solution, and excess water may be drawn off in the second water purge 212. The draw solution exiting the distillation or RO system 210 may then be reintroduced into the FO system 206. In some embodiments, this recycling process of draw solution between the distillation or RO system 210 and the FO system 206 may be the same or similar to the draw solution recycling process described in conjunction with FIG. 1 (e.g., between the RO system 106 and the FO system 104, etc.). In any event, the purged water from the first water purge 204 and/or the second water purge 212 may be reused, recycled, conveyed, or directed elsewhere.

Figure 3:
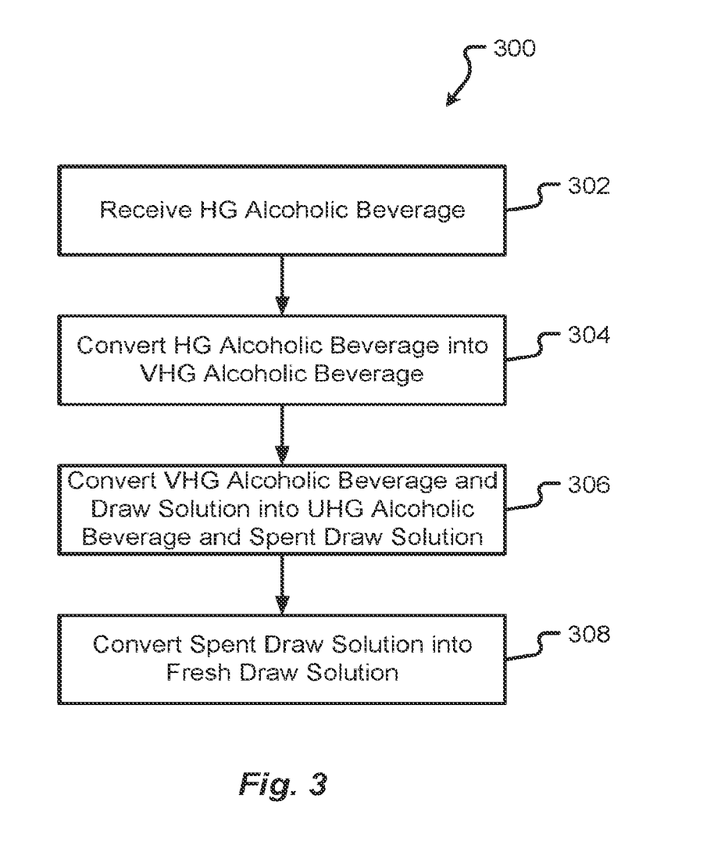
FIG. 3 is a flow diagram depicting a method of dewatering alcoholic beverages in accordance with embodiments of the present disclosure.

FIG. 3 is a flow diagram depicting a method 300 of dewatering alcoholic beverages in accordance with embodiments of the present disclosure. In one embodiment, method 300 begins with the receipt of an HG alcoholic beverage (step 302). The HG alcoholic beverage 102 may be provided from an infeed stream, or pumped from HG alcoholic beverage 102 tank, etc. In one embodiment, the HG alcoholic beverage 102 may be continuously provided via a pipeline, for example, directly from an alcoholic beverage supply source. In some embodiments, the HG alcoholic beverage 102 may be received via truck, railcar, pipeline, on-site storage, or other vessel. In some cases, the HG alcoholic beverage 102 may have an ABV of 5% to 14%.

Next, the HG alcoholic beverage 102 is conveyed (e.g., pumped, moved, etc.) along a fluid line to an initial dewatering system. The HG alcoholic beverage 102 may be conveyed to an RO system 202 where the HG alcoholic beverage 102 is converted into a VHG alcoholic beverage (step 304). For example, the RO system 202 may separate the HG alcoholic beverage 102 into separate streams. The streams may comprise a VHG alcoholic beverage stream and a removed water stream. In some embodiments, the water removed via the RO system 202 may be collected in a first water purge 204. As provided above, this water may be reused, recycled, and/or packaged. The VHG alcoholic beverage stream may have an ABV between, and including, 16% to 22%.

The method 300 continues by conveying (e.g., pumping, moving, etc.) the VHG alcoholic beverage along a fluid line to the FO system 206 (step 306). In step 306, the VHG alcoholic beverage and a draw solution are converted into a UHG alcoholic beverage and spent draw solution, respectively. This step can increase the gravity of the VHG alcoholic beverage, having an ABV of 16-22%, to a UHG alcoholic beverage, having an ABV of 24-46%, or greater. The conversion of the VHG alcoholic beverage into a UHG alcoholic beverage may be similar, if not identical, to the process described in conjunction with the FO system 206 of FIG. 2.

In some embodiments, the spent draw solution may be converted into a fresh draw solution (e.g., via a distillation and/or RO system 210) for reintroduction into the FO system 206 (step 308). Among other things, this process provides an efficient use of water in the system and allows for excess water to be reused, recycled, and/or packaged.

The process 300 described above may loop continuously, as long as step 302 is provided with an HG alcoholic beverage stream, and as long as the spent draw solution/fresh draw solution exists.

The exemplary systems and methods of this disclosure have been described in relation to dewatered alcoholic beverages (e.g., beer, cider, fermented malt beverages, etc.) and efficient processes for making the same. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

While the flowchart has been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a system, comprising: a reverse osmosis subcomponent to receive high gravity alcoholic beverage and output a very-high gravity alcoholic beverage having a greater alcohol by volume (ABV) percentage than the high gravity alcoholic beverage; a forward osmosis subcomponent to receive as an input, the very-high gravity alcoholic beverage and a draw solution and, via forward osmosis, output an ultra-high gravity alcoholic beverage having a greater ABV percentage than the very-high gravity alcoholic beverage and spent draw solution; and a reverse osmosis system that processes the spent draw solution, via reverse osmosis, producing a fresh draw solution.

Aspects of the above system include wherein the fresh draw solution corresponds to dewatered spent draw solution. Aspects of the above system include wherein the high gravity alcoholic beverage is substantially 5% to 14% ABV. Aspects of the above system include wherein the very-high gravity alcoholic beverage is substantially 16% to 22% ABV. Aspects of the above system include wherein the ultra-high gravity alcoholic beverage is substantially 24% to 46% ABV. Aspects of the above system include wherein the fresh draw solution is fed into the forward osmosis subcomponent as recycled draw solution. Aspects of the above system include wherein the reverse osmosis subcomponent removes an amount of water from the received high gravity alcoholic beverage, and wherein the amount of water is stored in a water purge tank. Aspects of the above system include wherein the forward osmosis subcomponent comprises at least one forward osmosis filter membrane that contacts the high gravity alcoholic beverage, and wherein the at least one forward osmosis filter membrane separates an amount of water from the high gravity alcoholic beverage.

Embodiments include a method, comprising: processing a high gravity alcoholic beverage to produce a very-high gravity alcoholic beverage, wherein the very-high gravity alcoholic beverage comprises a greater alcohol by volume (ABV) percentage than the high gravity alcoholic beverage; processing the very-high gravity alcoholic beverage to produce an ultra-high gravity alcoholic beverage, wherein the ultra-high gravity alcoholic beverage comprises a greater ABV percentage than the very-high gravity alcoholic beverage; and wherein processing the very-high gravity alcoholic beverage into the ultra-high gravity alcoholic beverage utilizes a draw solution and produces therefrom a spent draw solution, and wherein the spent draw solution is processed into the draw solution by at least one of reverse osmosis or distilling.

Aspects of the above method include wherein prior to processing the high gravity alcoholic beverage, the method comprises: receiving the high gravity alcoholic beverage as part of a continuous infeed stream. Aspects of the above method include wherein processing the high gravity alcoholic beverage to produce the very-high gravity alcoholic beverage comprises: conveying the high gravity alcoholic beverage to an initial dewatering station, wherein the initial dewatering station comprises at least one semipermeable membrane that separates the high gravity alcoholic beverage into very-high gravity alcoholic beverage stream and a removed water stream. Aspects of the above method include wherein processing the very-high gravity alcoholic beverage to produce the ultra-high gravity alcoholic beverage comprises: conveying the very-high gravity alcoholic beverage stream to a secondary dewatering station, wherein the secondary dewatering station comprises at least one forward osmosis filter membrane that contacts the very-high gravity alcoholic beverage, and wherein the at least one forward osmosis filter membrane separates an amount of water from the very-high gravity alcoholic beverage stream. Aspects of the above method include wherein the high gravity alcoholic beverage is received at an ABV of 5% to 14%. Aspects of the above method include wherein the very-high gravity alcoholic beverage stream is substantially 16% to 22% ABV. Aspects of the above method include wherein the ultra-high gravity alcoholic beverage is substantially 24% to 46% ABV.

Embodiments include a system, comprising: a high gravity alcoholic beverage conveyed along a fluid line; a reverse osmosis filter comprising a semipermeable membrane that separates the high gravity alcoholic beverage conveyed into separate streams comprising a very-high gravity alcoholic beverage stream and a removed water stream, wherein the very-high gravity alcoholic beverage stream has a greater alcohol by volume (ABV) percentage than the high gravity alcoholic beverage received; and a forward osmosis filter comprising a forward osmosis membrane that contacts the very-high gravity alcoholic beverage stream exiting the reverse osmosis filter, and wherein the forward osmosis membrane separates an amount of water from the very-high gravity alcoholic beverage stream, via forward osmosis, producing an ultra-high gravity alcoholic beverage having a greater ABV percentage than the very-high gravity alcoholic beverage stream.

Aspects of the above system further comprising: a reverse osmosis system that processes the amount of water separated from the very-high gravity alcoholic beverage stream including spent draw solution, via reverse osmosis, into a fresh draw solution, and wherein the fresh draw solution is recycled and conveyed to the forward osmosis filter for use in separating additional water from the very-high gravity alcoholic beverage stream. Aspects of the above system include wherein the high gravity alcoholic beverage is substantially 5% to 14% ABV, wherein the very-high gravity alcoholic beverage stream is substantially 16% to 22% ABV, and wherein the ultra-high gravity alcoholic beverage is substantially 24% to 46% ABV. Aspects of the above system include wherein the processed amount of water separated from the very-high gravity alcoholic beverage stream comprises potable water that is conveyed in a separate fluid line apart from the fresh draw solution. Aspects of the above system include wherein the high gravity alcoholic beverage is a beer, cider, or an alcoholic malt base.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

What is claimed is:

1. A method, comprising:
   processing a high gravity alcoholic beverage having an alcohol by volume (ABV) percentage between 5% and 14% to produce a very-high gravity alcoholic beverage via at least reverse osmosis, wherein the very-high gravity alcoholic beverage includes an ABV percentage between 16% and 22%;
   processing the very-high gravity alcoholic beverage to produce an ultra-high gravity alcoholic beverage via forward osmosis, wherein the ultra-high gravity alcoholic beverage includes an ABV percentage between 24% and 46%; and
   wherein processing the very-high gravity alcoholic beverage into the ultra-high gravity alcoholic beverage utilizes a draw solution and produces therefrom a spent draw solution, and wherein the spent draw solution is processed into the draw solution by at least one of reverse osmosis or distilling.

2. The method of claim 1, wherein prior to processing the high gravity alcoholic beverage, the method comprises:
   receiving the high gravity alcoholic beverage as part of a continuous infeed stream.

3. The method of claim 2, wherein processing the high gravity alcoholic beverage to produce the very-high gravity alcoholic beverage comprises:
   conveying the high gravity alcoholic beverage to an initial dewatering station prior to processing via reverse osmosis, wherein the initial dewatering station comprises at least one semipermeable membrane that separates the high gravity alcoholic beverage at least partially into very-high gravity alcoholic beverage stream and a removed water stream.

4. The method of claim 3, wherein processing the very-high gravity alcoholic beverage to produce the ultra-high gravity alcoholic beverage via forward osmosis comprises:
   conveying the very-high gravity alcoholic beverage stream to a secondary dewatering station, wherein the secondary dewatering station comprises at least one forward osmosis filter membrane that contacts the very-high gravity alcoholic beverage, and wherein the at least one forward osmosis filter membrane separates an amount of water from the very-high gravity alcoholic beverage stream.

5. The method of claim 1, wherein the high gravity alcoholic beverage is a beer, cider, or an alcoholic malt base.

6. A method comprising:
   receiving a first alcoholic beverage having a first alcohol by volume (ABV) of 5% to 14% ABV;

dewatering the first alcoholic beverage at a reverse osmosis (RO) system to provide a second alcoholic beverage product having a second ABV of 16% to 22% ABV, wherein the second ABV is greater than the first ABV;

conveying the second alcoholic beverage to a forward osmosis (FO) system;

producing a third alcoholic beverage having a third ABV and a spent draw solution via forward osmosis, wherein the third ABV is 24% to 46% ABV and is greater than the second ABV; and dewatering the spent draw solution to produce a draw solution by at least one of reverse osmosis or distilling.

7. The method of claim 6, further comprising:

collecting water removed from the first alcoholic beverage in a water purge tank; and collecting water removed from the spent draw solution in a second water purge tank.

8. The method of claim 6, wherein the first alcoholic beverage is a beer, cider, or an alcoholic malt base.

9. The method of claim 6, further comprising reintroducing the draw solution into the FO system.

10. The method of claim 6, wherein the FO system comprises a flow path having a serpentine pattern.

11. The method of claim 6, further comprising:

adding a metered amount of water to the third alcoholic beverage.

12. The method of claim 11, wherein the metered amount of water is added with a desired carbonation.

13. A method, comprising:

conveying, by a fluid line, an alcoholic beverage having a first alcohol by volume (ABV) percentage between 5% and 14% to a reverse osmosis system;

processing, by the reverse osmosis system, the alcoholic beverage having the first ABV percentage causing a first amount of water to be removed from the alcoholic beverage having the first ABV percentage and converting the alcoholic beverage having the first ABV percentage into an alcoholic beverage having a second ABV percentage, wherein the second ABV percentage is between 16% and 22%;

processing, by a forward osmosis system, the alcoholic beverage having the second ABV percentage causing a second amount of water to be removed from the alcoholic beverage having the second ABV percentage and converting the alcoholic beverage having the second ABV percentage into an alcoholic beverage having a third ABV percentage, wherein the third ABV percentage is between 24% to 46%; and wherein processing the alcoholic beverage having the second ABV percentage into the alcoholic beverage having the third ABV percentage utilizes a draw solution and produces therefrom a spent draw solution, and wherein the spent draw solution is processed into the draw solution by at least one of reverse osmosis and distilling.

14. The method of claim 13, wherein the alcoholic beverage having the first ABV percentage is conveyed by the fluid line to the reverse osmosis system as part of a continuous infeed stream.

15. The method of claim 14 wherein processing, by the forward osmosis system, the alcoholic beverage having the second ABV percentage to produce the alcoholic beverage having the third ABV percentage comprises:

conveying the alcoholic beverage having the first ABV percentage to an initial dewatering station, wherein the initial dewatering station comprises at least one reverse osmosis filter comprising a semipermeable membrane that separates the alcoholic beverage having the first ABV percentage into an alcoholic beverage stream having the second ABV percentage and a removed water stream.

16. The method of claim 15, wherein processing, by the forward osmosis system, the alcoholic beverage having the second ABV percentage to produce the alcoholic beverage having the third ABV percentage comprises:

conveying the alcoholic beverage stream having the second ABV percentage to a secondary dewatering station, wherein the secondary dewatering station comprises a plurality of forward osmosis filter membranes that contact the alcoholic beverage having the second ABV percentage, and wherein the plurality of forward osmosis filter membranes separate an amount of water from the alcoholic beverage stream having the second ABV percentage via forward osmosis.

* * * * *